May 23, 1972 — G. D. MANVILLE — 3,664,654
DUAL ARM ATTACHMENT FOR DRILL PRESS
Filed March 30, 1970 — 2 Sheets-Sheet 1

George D. Manville
Inventor

May 23, 1972   G. D. MANVILLE   3,664,654
DUAL ARM ATTACHMENT FOR DRILL PRESS
Filed March 30, 1970   2 Sheets-Sheet 2

George D. Manville
Inventor

United States Patent Office 3,664,654
Patented May 23, 1972

3,664,654
DUAL ARM ATTACHMENT FOR DRILL PRESS
George D. Manville, 35520 Oak Glen Road,
Yucaipa, Calif. 92399
Filed Mar. 30, 1970, Ser. No. 23,759
Int. Cl. B23q 3/04, 3/10; B25b 5/14
U.S. Cl. 269—9
3 Claims

ABSTRACT OF THE DISCLOSURE

A universal attachment mountable on the column of a drill press, or the like, in which a pair of angularly, linearly adjustable arms extend from opposite sides of the support above the drill press work table to position and clamp elongated work pieces of any cross-sectional shape during drilling operations thereon.

---

Prior known drill press attachments employ a single arm extending from a clamping band or collar mounted on the column of the drill press, over the worktable to clamp the work piece firmly to the table while the piece is drilled. Examples of the type of drill press clamp to which my present invention pertains are disclosed in U.S. Pats. No. 2,269,727; No. 2,613,557; No. 2,526,553; No. 2,486,638; and No. 3,345,889.

A serious disadvantage with these prior clamps is the difficulty encountered in drilling holes through elongated work pieces such as bar stock, tubes, rods, and the like wherein the piece must be clamped at a single point of contact. Frequently, when the drill engages the surface of the work piece, the work piece tends to rotate with the drill. This often occurs, moreover, when the drill hits a cold shot, i.e., hardened section in otherwise ductile or malleable material.

To overcome the foregoing disadvantage, it is an object of my invention to provide a novel drill press attachment having a pair of spaced apart arms carrying clamps to engage elongated members at two points of contact eliminating the tendency of the work piece to rotate with the drill.

It is another object of my invention to provide a dual-arm drill press attachment in which the arms are adjustable angularly with respect to each other in accordance with the length of the work piece.

It is still another object of my present invention to provide a dual arm drill press attachment in which the ends of the arms are adapted to mount a variety of different clamp members, i.e., toggle clamps and the like.

Briefly, the attachment of my present invention comprises a pair of sheet metal segments, complementarily shaped to fit around opposite sides of a drill press column, and engage each other in overlapping sliding relationship to form an open ended box-like member. By means of adjustment screws mounted in ball and socket means and extending through opposite sides of the segments, these segments can be angularly adjusted relative to each other. Each lateral side wall of each segment is provided with a sleeve member to slidably support an elongated arm the end of which carries a suitable clamp device such as a toggle clamp, for example.

DETAILED DESCRIPTION

Figure 1:
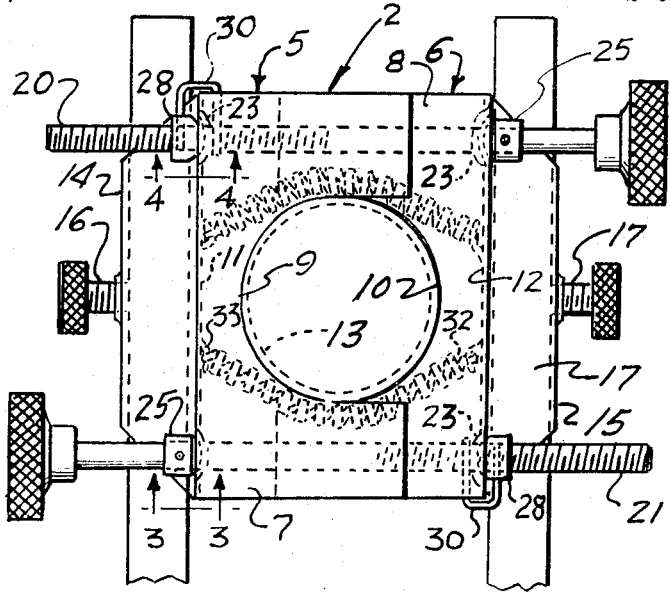
FIG. 1 is a top elevational view showing the general organization and arrangement of the drill press attachment of my invention.
Figure 2:
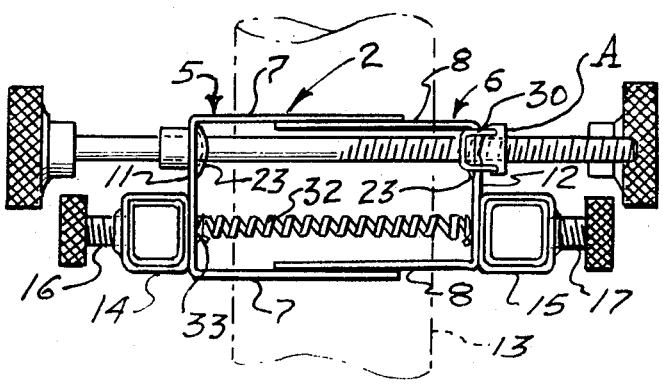
FIG. 2 is an end elevational view of the attachment of FIG. 1.

As shown in the figures the drill press attachment of my invention preferably takes the shape of a hollow box-like structure 2 formed of a pair of opposed U-shaped members 5 and 6, fabricated of heavy gage sheet steel, for example, one U-shaped member 6 dimensioned to nest within the other 5 with a sliding fit. The flanges 7 and 8 of each of the U-shaped members 5 and 6 has an arcuate central cutout 9 and 10 respectively sized to fit around the post or column 13 of a drill press (not shown), as best shown in FIG 1, with the side portions of the flanges 7 and 8 assembled together in overlapping relationship.

In the bight or side wall 11 and 12 of each U-shaped member 5 and 6, on the exterior side thereof, a tubular sleeve 14 and 15 defining an arm support is brazed, welded, or otherwise attached in any convenient manner, each of the supports 14 and 15 having a lock screw 16 and 17 provided midway between its ends to firmly secure an arm therein.

Figures 3, 4:
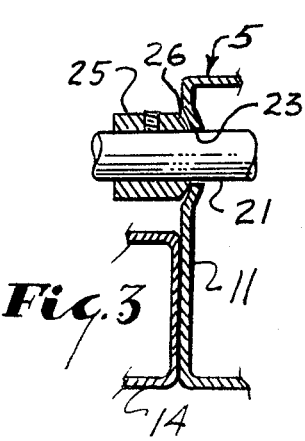
FIG. 3 is a fragmentary cross-sectional view taken along lines 3—3 of FIG. 1.
FIG. 4 is a fragmentary cross-sectional view taken along lines 4—4 of FIG. 1.
Figure 5:
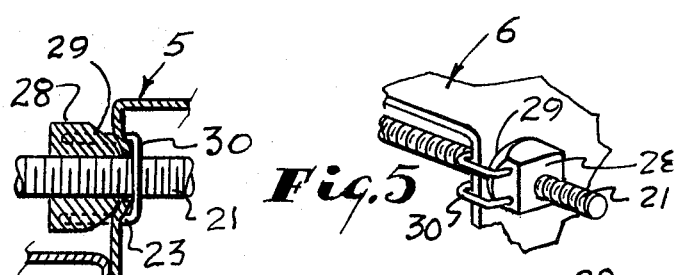
FIG. 5 is an enlarged fragmentary view as indicated by A in FIG. 1.
Figure 6:
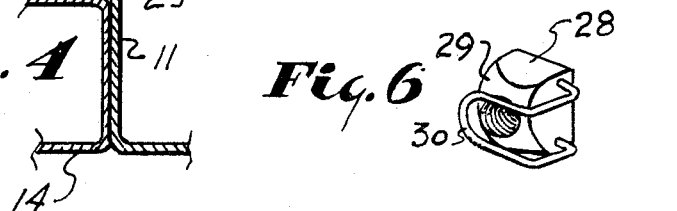
FIG. 6 is an enlarged view of the nut of FIG. 5 rotated 90°.

The U-shaped members 5 and 6 are assembled and maintained in their relative positions by elongated screws 20 and 21 positioned on opposite sides of the drill press column 13. Angular adjustment of the U-shaped members relative to each other is accomplished by manual operation of these elongated screws 20 and 21 which are extended through dimpled or spherically countersunk oversized bores (not shown but indicated by 23) in the end walls 11 and 12 of the U-shaped members 5 and 6 as best shown in FIG. 3 and secured therein on one end by collars or bushings 25 having hemispherical ends 26 recessed in the dimpled bores 23, and threadedly engaged on their other ends in nuts 28 also provided with hemispherical ends 29 seated in their corresponding dimpled bores 23. The nuts are maintained and fastened in position by metal wire support loops 30 attached thereto substantially as shown.

The U-shaped members 5 and 6 are further fastened together by means of tension springs 32 extending from opposite end walls 11 and 12 of the members 5 and 6 and attached to tangs or hooks 33 provided on the interior wall of the ends walls 11 and 12.

The hooks 33 are spaced together by a distance appreciably smaller than the diameter of the drill press column 13, as best shown in the diagrammatic plan view of FIG. 1 so that the springs 32 are stretched to near maximum tension to thereby firmly maintain the members in position on column 13.

Figure 7:
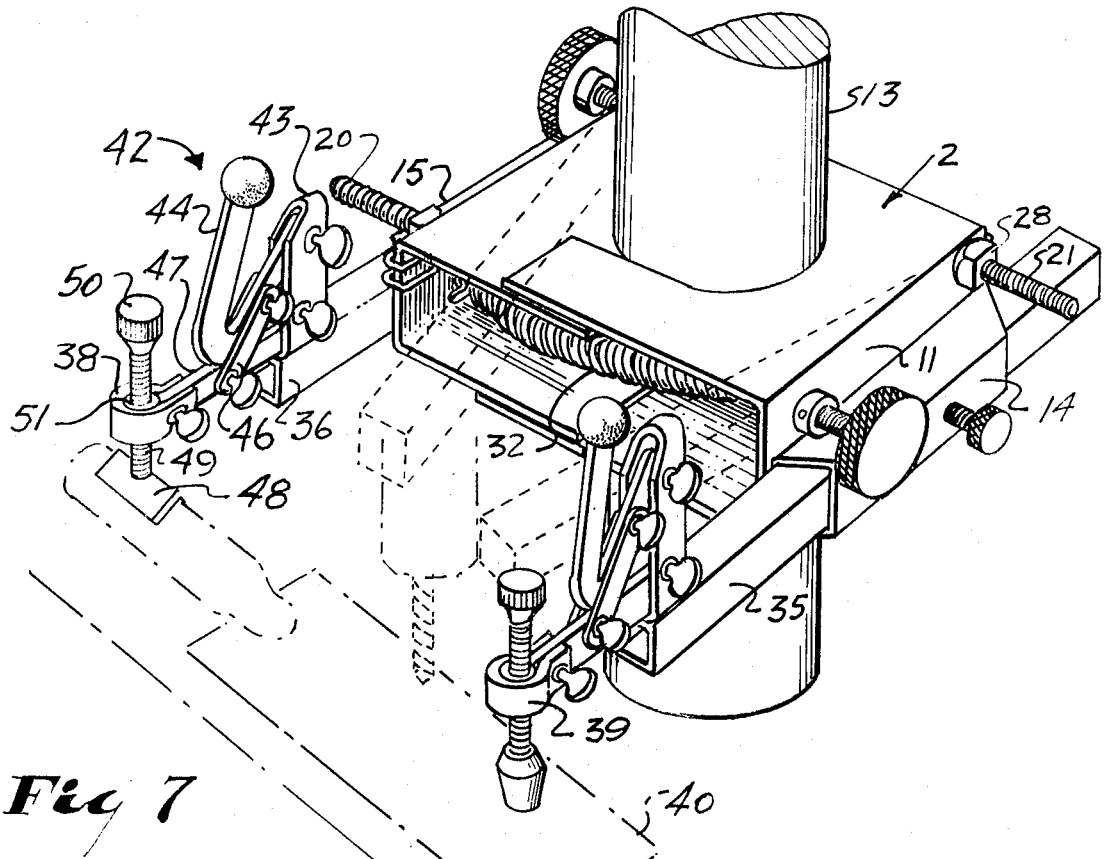
FIG. 7 is a perspective view of the drill press attachment of FIGS. 1 and 2.

As best shown in the perspective view of FIG. 7, the support 2 is provided with a pair of elongated arms 35 and 36, extending through each of the tubular arm supports 14 and 15, and longitudinally adjustable therein, these arms being equipped on their outer ends with pressure pads or toggle clamps 38 and 39 by which means a work piece 40 shown in broken line can be firmly gripped to the surface of the drill press work table (not shown).

By rotating screws 20 and 21 in opposite directions the angular relationship of the arms 35 and 36 is quickly and easily accomplished to accommodate work pieces of short or long lengths, as indicated in the dotted lines.

The toggle clamp 42 shown in FIG. 7 is typical of the type used for round stock. The clamp 42 is supported in a bracket 43 and comprises a curved toggle handle 44 articulated with a dead center type link 46 to arm 47, a V-shaped foot 48 being secured to the end of a screw 49 having a knurled end 50 and extending through threaded boss 51, in the usual manner. The toggle clamp 42 forms no part of my present invention and is shown merely as an example of the type clamp that can be used with the attachment of the present invention.

Figures 8, 9:
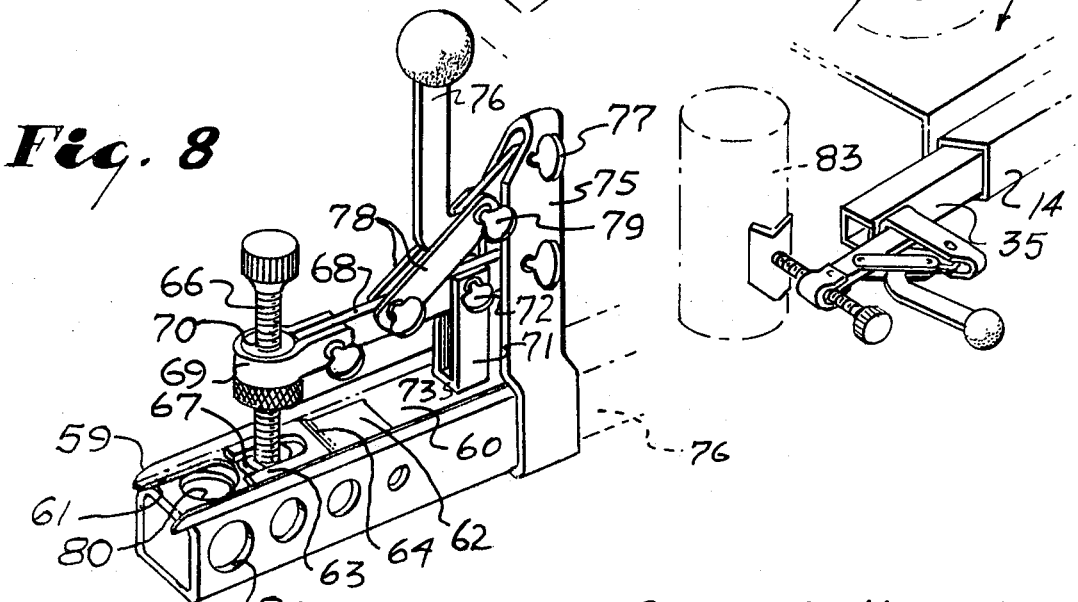
FIG. 8 is a detail perspective view of a typical toggle clamp.
FIG. 9 is a fragmentary view showing an arm and toggle clamp rotated 90° to contact an elongated work piece from the side.

A further feature of my invention resides in a novel hold-down pad or foot, shown in FIG. 8, which is mountable on the end of one or both arms 35 and 36 and is ideally suitable for clamping relatively small work pieces or parts to the work table of a drill press.

As shown, the foot 59 is formed of a base plate 60 which is forked or bifurcated at its outer end 61. A second, smaller, joggled plate 62, also having a bifurcated end 63 extending from the joggle 64, is spot-welded, brazed, or otherwise fastened on the upper surface of the base plate 60 to form a retainer for screw 66 having a pivotal pad 67 on its lower end, the pad being slidable back and forth between the base and retainer plates 60 and 62 respectively. The word "joggle" as used to describe plate 62, refers to the angular offset identified by reference numeral 64 adjacent bifurcated end 63 to provide a shallow space between bifurcated end 63 and base plate 60 in which pad 67 on the end of screw 60 is slidably recessed.

The screw 66 is threadedly supported in an arm 68 having a boss 69 affixed to its outer end and an axial threaded bore 70 through which screw 66 is extended for support.

Arm 68 is pivotally coupled, at its inner end, to base plate 60 in a clevis 71 by a thumbscrew 72, the base or bight 73 of clevis being welded or otherwise securely fastened to base plate 60.

To operate the foot 59, from the end of support 35, clevis 71 is mounted on the end of support arm 68 which extends through and is connected to second clevis 75 having a lever handle 76 pivotally connected at its upper closed end by a thumbscrew 77. The lever handle is, in turn, coupled with screw support arm 68 by a pair of dead-center links 78 on each side and pivotally connected thereto by thumbscrews 79 at each end thereof. By using thumbscrews at all pivot points, the elements can be tightened at all points by finger pressure.

In performing drilling operations on small work pieces, such as a nut (not shown) for example, the portion of the work piece to be drilled is positioned under the base plate 60 of the foot 59 with the portion between the bifurcations at 61 somewhat as shown in FIG. 8. The drill operates in the space, as shown, between the bifurcations. The arm 76 is provided with perforations 80 of various sizes to permit the drill (not shown) to extend therethrough. This will be apparent to those skilled in the art.

Operation of the clamp

With the springs 32 and operating screws 20 and 21 removed, the U-shaped segments 5 and 6 are mounted around the drill press column 13, from opposite sides thereof, with the segment flanges 7 and 8 in overlapping relationship. The springs 32 are then fastened at each end thereof to the hooks 33 on the inside end walls 11 and 12 of the segments, one spring on each side of the column 13 as shown in FIG. 1. The elongated dimpled bores 23 will be in alignment so the operating screws 20 and 21 can be extended therethrough with the hemispherical or rounded ends of the collar bearings 25 mounted on the operating screws 20 and 21 seated in the dimples 23 formed around the elongated bores to define a ball and socket; the other end of the screws 20 and 21 threadedly extended through the spherical nuts 28 which are partially and movably recessed in the dimpled bores 23 in the wall in the opposite segment, operating similarly to a ball and socket to permit relative angular movement of segments 5 and 6.

As shown in FIG. 7, the operating screws 20 and 21 are oppositely arranged to be turned or rotated in opposite directions to change the angular relationship of the segments 5 and 6, i.e., by turning screws 20 in one direction, and screw 21 in the opposite direction, the angular relationship of the segments 5 and 6 can be changed to adjust the spacing between arms 35 and 36, to accommodate short or long work pieces, as indicated in the dotted lines.

It can be seen that springs 32 and screws 20 and 21 firmly maintain the two segments 5 and 6 in position on the drill press column 13. Adjustment of the attachment 2 upwardly or downwardly on column 13 is simply accomplished by merely loosening both operating screws 20 and 21 and slidably moving the support 2 to the position desired, and then re-tightening the screws.

For end drilling elongated pieces, the arm 35 can be removed from support 14, rotated 90°, and reinserted in support 14 so that the toggle clamp assembly contacts the side of the workpiece 83 substantially as shown in FIG. 9. In this instance the arm 36 and toggle clamp on the other side (not shown) corresponding is rotated in the same manner to grip and clamp the work piece 83 firmly therebetween.

While in order to comply with the statute, the invention has been described in language more or less specific as to structural features, it is to be understood that the invention is not limited to the specific features described and shown above, but that the means and construction herein disclosed comprise the preferred form of putting the invention into practice, and the invention therefore is claimed in any of its forms or modifications within the legitimate and valid scope of the appended claims.

I claim:

1. A dual arm attachment for a drill press having a work-supporting table and a column perpendicular to said table, and comprising:
   (a) a pair of complementally formed U-shaped segments slidably nesting one within the other and each having flanges shaped to slidably fit around opposite sides of said column to form an open-ended box-like support,
   (b) spring means extending from one of said segments to the other and fastened thereto on each side of said column to elastically connect together and retain said segments in position thereon,
   (c) arm support means on the end walls of each of said segments on each side of said column,
   (d) an elongated arm slidably mounted in each of said support means with the free ends thereof extending above said table,
   (e) adjustment means defined by threaded ball and socket means mounted in the end walls of each of said segments, elongated screws threadedly mounted in each of said ball and socket means said screws being simultaneously turnable in opposite directions to angularly move said segments relative to each other and thereby vary the distance between the free ends of said arms supported thereby, and
   (f) clamp means on the free ends of said arms to engage and clamp a workpiece on said table.

2. A dual arm attachment for a drill press having a work-supporting table and a column perpendicular to said table, and comprising:
   (a) a pair of complementally formed U-shaped segments slidably nesting one within the other and each having flanges shaped to slidably fit around opposite sides of said column to form an open-ended box-like support,
   (b) spring means extending from one of said segments to the other and fastened thereto on each side of said column to elastically connect together and retain said segments in position thereon, (c) arm support means on the end walls of each of said segments on each side of said column, (d) an elongated arm slidably mounted in each of said support means with the free ends thereof extending above said table, (e) adjustment means comprising elongated screws extending through the end walls of said segments on opposite sides of said column, said walls having oversized dimpled bores recessing hemispherically shaped nuts threadedly mounted on said screws, whereby one of said screws is rotatable in one direction, the other being simultaneously rotatable in the opposite direction, to angularly move one segment relative to the other around said column to vary the distance between the free ends of said arms supported thereby, and (f) clamp means on the free ends of said arms to engage and clamp a workpiece on said table.

3. A dual arm attachment for a drill press having a work-supporting table and a column perpendicular to said table, and comprising:

(a) a pair of complementally formed U-shaped segments slidably nesting one within the other and each having flanges shaped to slidably fit around opposite sides of said column to form an open-ended box-like support, (b) spring means extending from one of said segments to the other and fastened thereto on each side of said column to elastically connect together and retain said segments in position thereon, (c) arm suport means mounted on the end walls of each of said segments on each side of said column, (d) an elongated arm slidably mounted in each of said support means with the free ends thereof extending above said table, (e) adjustment means between said segments and connected thereto to angularly move said segments relative to each other around said column to vary the distance between the free ends of said arms above said table and (f) clamp means on the free ends of said arms to engage and clamp a workpiece to said table comprising a clevis mounted on one end of said clamp support arm, a lever arm pivotally connected at one end in said clevis, and a threaded bushing at the other end of said lever arm, a toggle arm connected at one end in said clevis, dead-center linkage connecting said toggle arm to said lever arm, a clamp screw threadedly mounted in said threaded bushing, a washer pivotally mounted on the free end of said clamp screw, a base plate having a bifurcated end coterminus with the end of said support arm, a joggled plate mounted on said base plate and having a bifurcated end adjacent to the bifurcated end of said base plate, said pivotal washer being slidably retained between said base plate and said joggled plate with said clamp screw extending through the bifurcated end of said joggled plate to thereby permit relative movement of said pivotal washer upon rotation of said clamp screw to clamp and unclamp a small workpiece between said base plate and said support arm, and at least one bore in said support arm alignable with the bifurcated end of said base plate to permit a drill to extend thereinto.

References Cited

UNITED STATES PATENTS

| 3,069,935 | 12/1962 | Garvin | 269—60 |
| 3,495,795 | 2/1970 | Brown | 269—71 X |
| 2,558,768 | 7/1951 | McCormick | 248—221 |
| 2,637,226 | 5/1953 | Clark | 269—92 |
| 3,185,470 | 5/1965 | Zitner | 269—154 X |

WAYNE A. MORSE, Jr., Primary Examiner

U.S. Cl. X.R.

269—56, 71, 78, 87.3, 88, 97, 146, 149, 154, 248